ELECTRICALLY OPERATED MUSIC DISPLAY AND CUING APPARATUS
Filed June 16, 1965 5 Sheets-Sheet 1
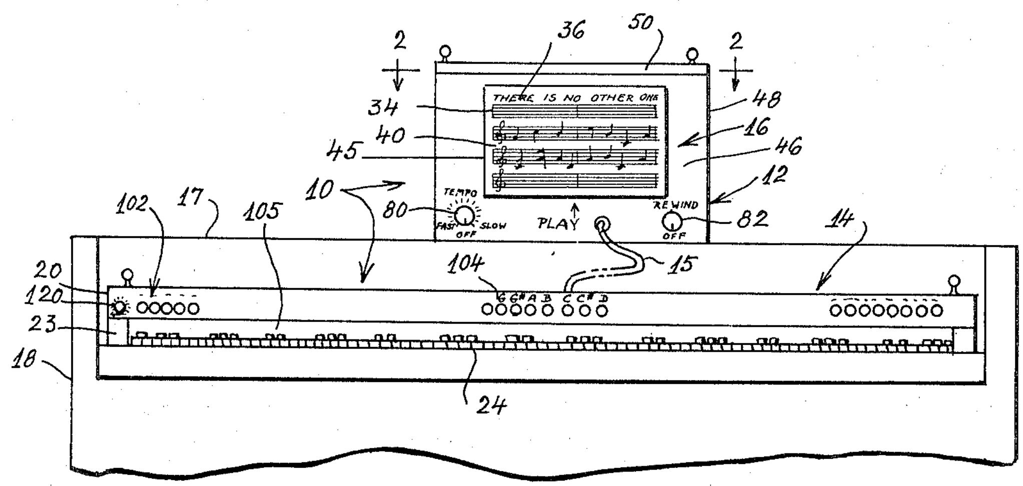
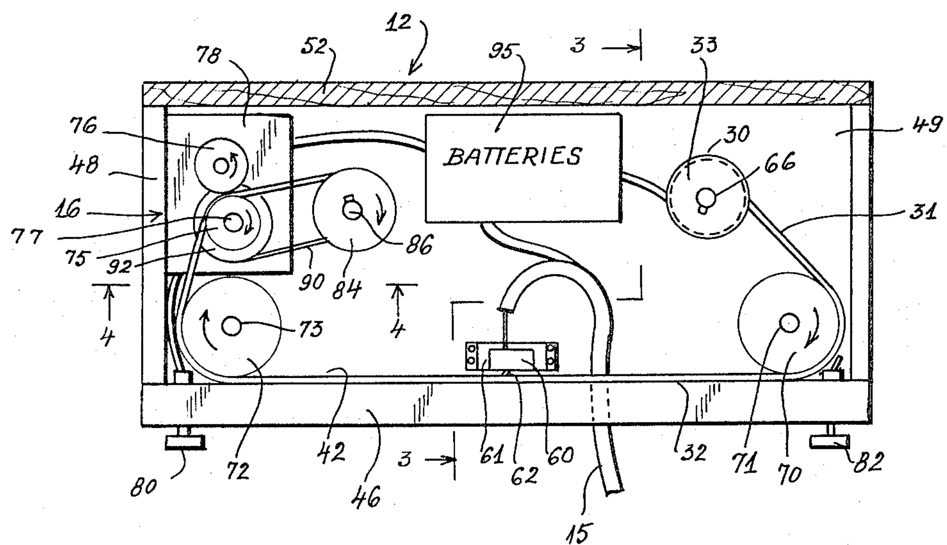
INVENTOR
Dorothea M. Weitzner
BY Polachek & Saulsbury
ATTORNEYS ELECTRICALLY OPERATED MUSIC DISPLAY AND CUING APPARATUS
Filed June 16, 1965 5 Sheets-Sheet 2
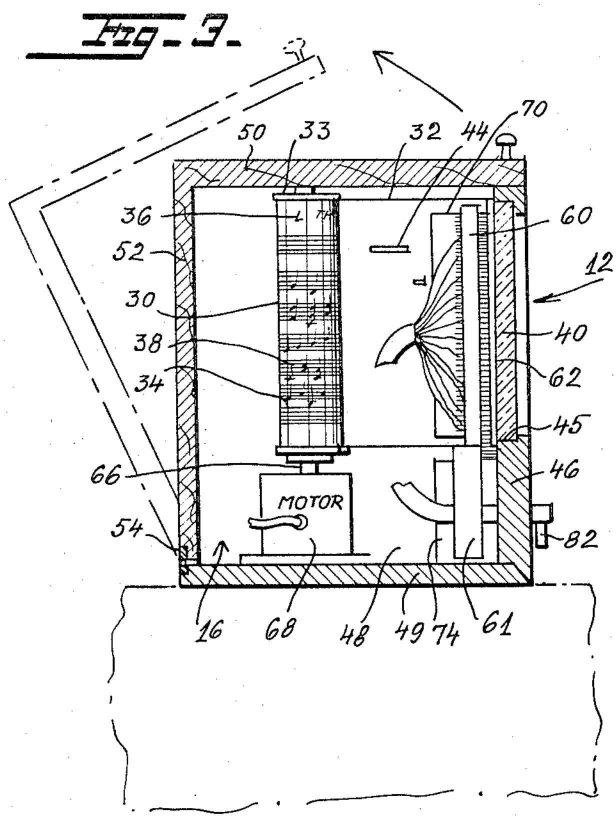
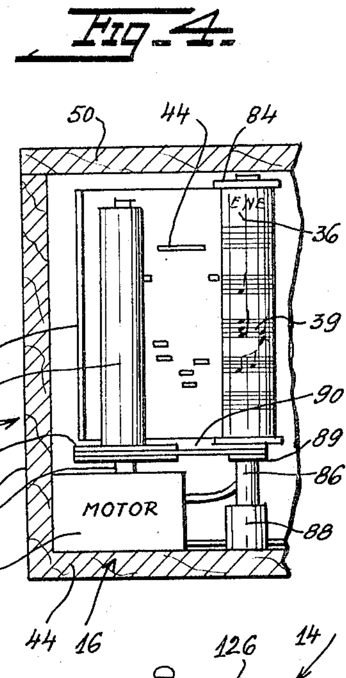
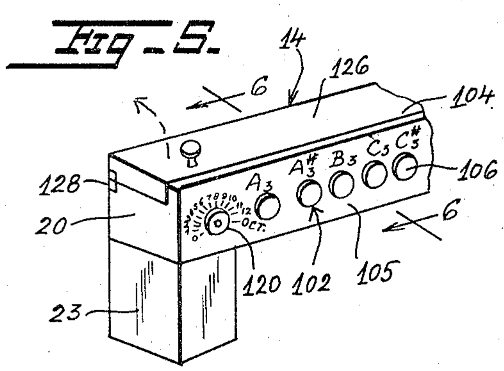
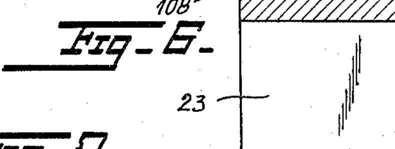
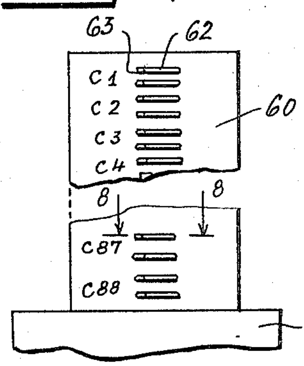
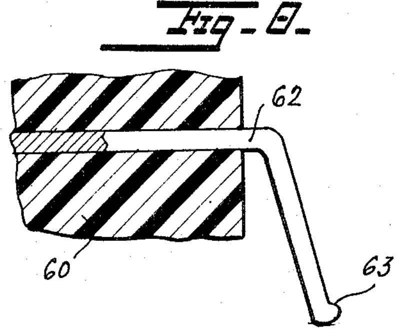
INVENTOR
Dorothea M. Weitzner
BY Polachek & Saulsbury
ATTORNEYS.

ELECTRICALLY OPERATED MUSIC DISPLAY AND CUING APPARATUS
Filed June 16, 1965
Fig. 11.
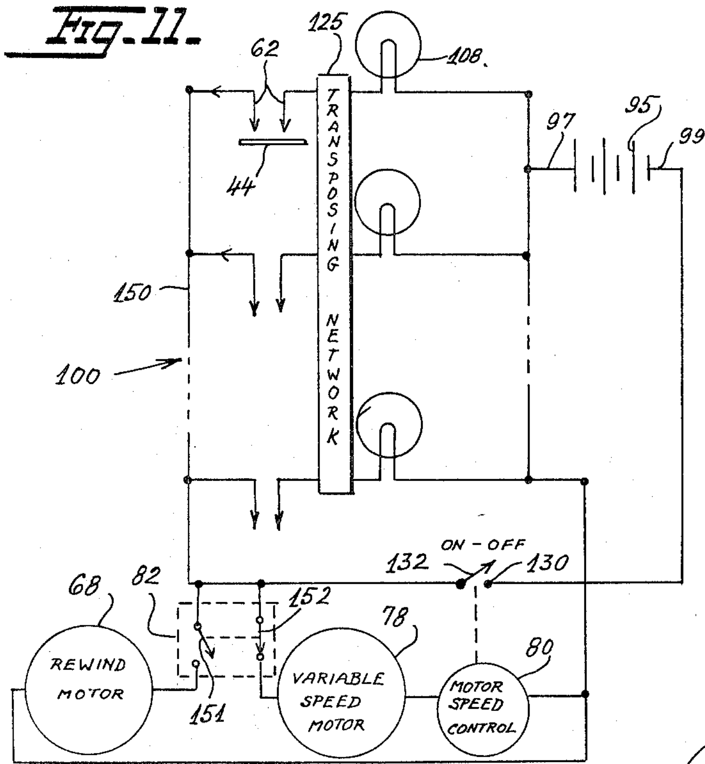
Fig. 9.
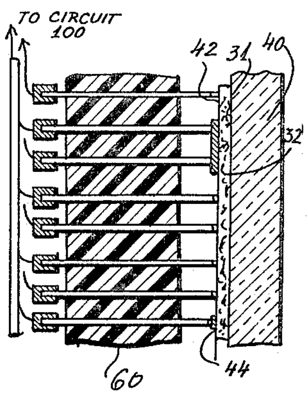
Fig. 10.
INVENTOR
Dorothea M. Weitzner
BY Polachek & Saulsbury
ATTORNEYS.

ELECTRICALLY OPERATED MUSIC DISPLAY AND CUING APPARATUS
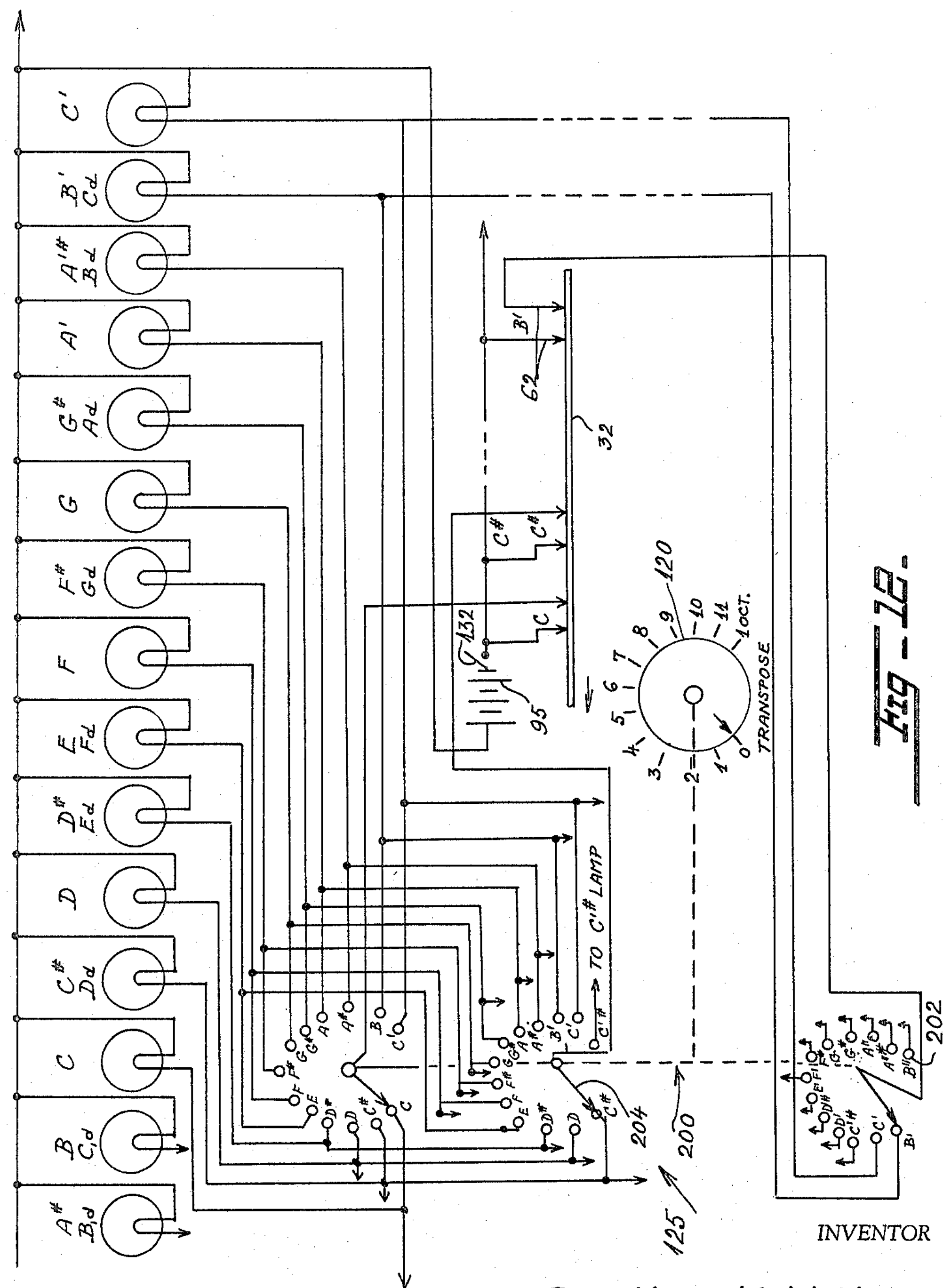
INVENTOR
Dorothea M. Weitzner
BY Polachek & Saulsbury
ATTORNEYS.

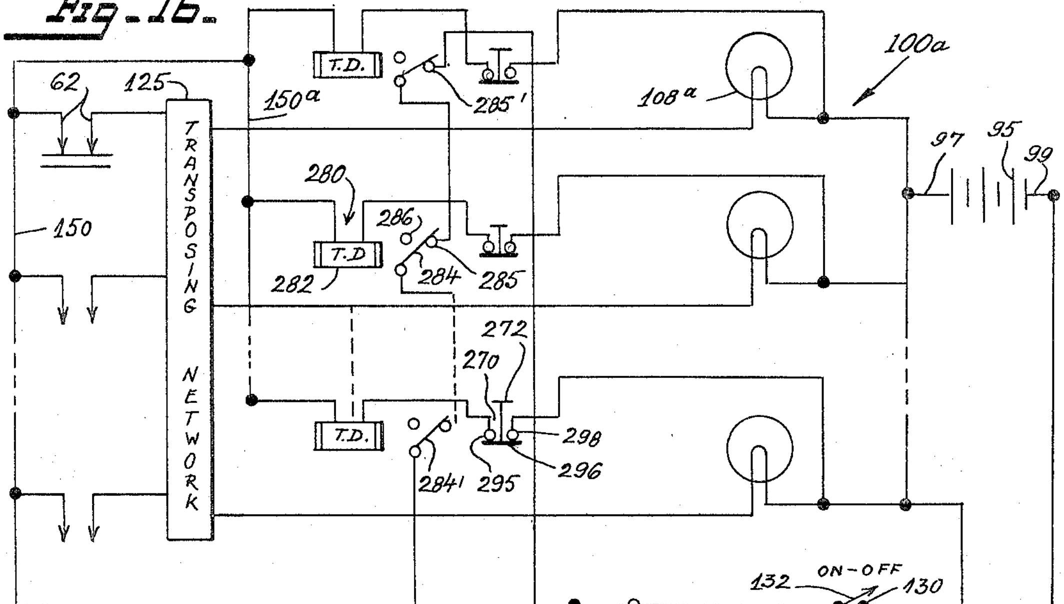
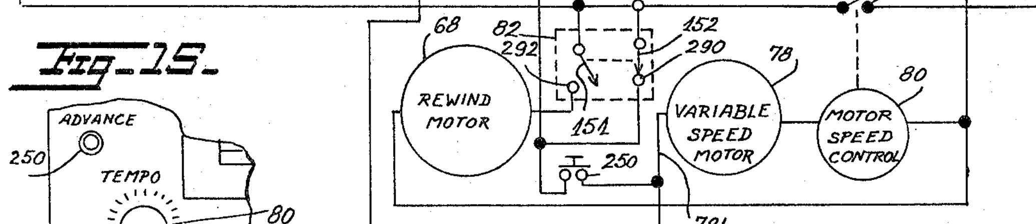
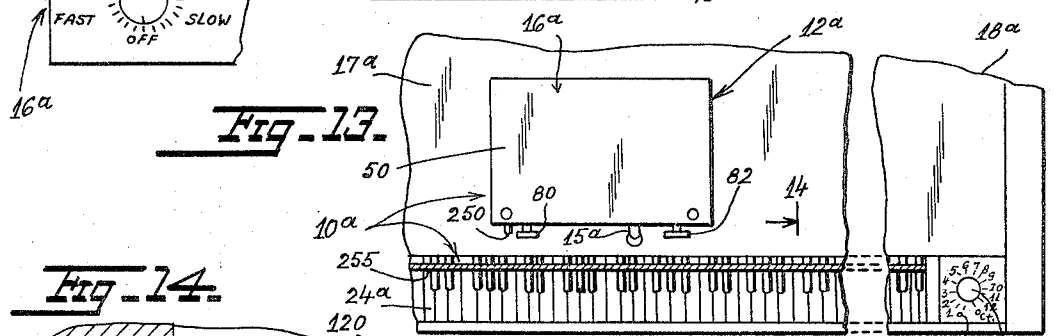
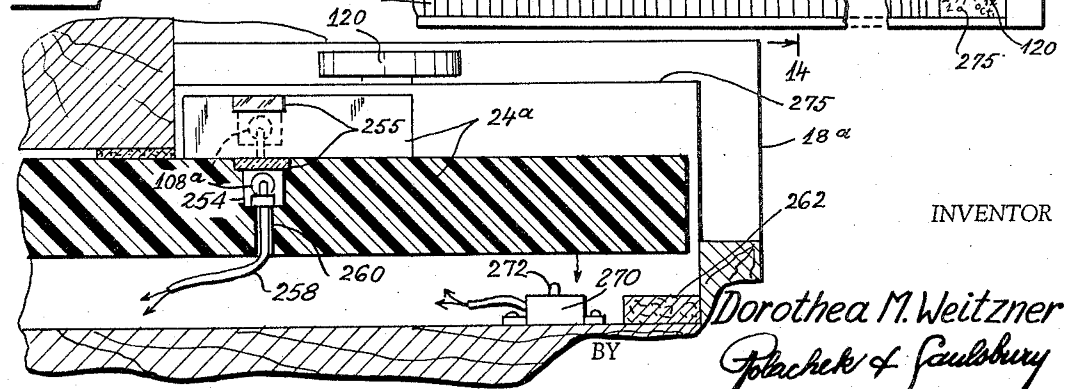
INVENTOR
Dorothea M. Weitzner
BY
Polachek & Saulsbury
ATTORNEYS.

3,379,087
ELECTRICALLY OPERATED MUSIC DISPLAY AND CUING APPARATUS

Dorothea M. Weitzner, 8 E. 62nd St., New York, N.Y. 10021

Filed June 16, 1965, Ser. No. 464,457
5 Claims. (Cl. 84—478)

ABSTRACT OF THE DISCLOSURE

A music display and cuing apparatus is described. A web carrying conventional musical notation on one side has electrically conductive coded marks on the other side. The web is displayed at a musical instrument. An associated cuing device has lamps disposed adjacent keys to light up when decoding elements contact the coded marks. Circuitry in the display apparatus and cuing device make it possible to cue transposed keys automatically, to advance the web rapidly to any desired point, and to reverse the web at will.

This invention concerns an electrically operated music display and cuing apparatus.

According to the invention there is provided a music display device including a cabinet in which a music scroll is supported on rollers or reels and is carried past a viewing window. A music selection consisting of notes on musical staves is inscribed on the front side of a web wound up and forming the music scroll. The notes may be accompanied by words inscribed near the musical staves. On the rear side of the web are electrically conductive narrow stripes of metallic ink. These stripes have lengths corresponding to the time values of the notes on the front side. The stripes are located in positions corresponding to positions of the notes on the staves. The lengths of the stripes and their positions constitute a musical code. The stripes are decoded by means of a code reading head including wiper contacts which sense the conductive stripes. The wiper contacts are connected in circuit with a cuing display device forming part of the apparatus.

The cuing display device is housed in a separate elongated cabinet adapted to be placed upon a piano or other instrument, or on a music stand, or located where it can be seen by a student of a musical instrument of any type. The cuing display device has a series of lamps on its front panel connected in circuit with the wiper contacts. Each lamp is connected to a particular pair of wiper contacts so that this lamp will light up when its associated wiper contacts contact a particular metallic stripe on a music web.

If the cuing display device is mounted on a piano just above the keyboard, the lamps will be located just above the keys which the lamps respectively represent. The music display device can be located on the music stand or on top of the piano. When the apparatus is turned on, the music web will be drawn at a constant speed across the viewing window of the device. The pianist reading the music will be cued as to the notes to be played by the successive lighting of one or more lamps on the associated cuing display device. The length of time each lamp lights determines the length of time a particular piano key is to be held down. The music display device is provided with means for adjusting the speed of travel of the music web. This constitutes a tempo adjustment feature. The curing device has a transposition feature, whereby the key in which any selection is written can be cued for playing in any other key. The lamps of the cuing device will light up a selected transposed key rather than for the key in which the music appears on the moving music.

The apparatus can be used for silent drill by a student in learning sight reading of music, musical notation identification, note transposition study, rhythm study, etc. The apparatus can be used as a convenient means for displaying music to be played without having to turn pages. The apparatus can be used by singers as a visual cuing means without having to read music notes on a printed sheet. The apparatus can be used by players of any known type of string, woodwind, brass, percussion or other instrument for any of the purposes above mentioned. A single music display device can be used for driving a plurality of cuing display devices simultaneously so that a group of players of different instruments can all be cued from a single music web.

The cuing display device can be physically embodied in the piano instead of being a separate entity. In this arrangement, a lamp will be provided in each key of the piano. The lamps are connected in circuit with a transposition network located inside the piano case. An interlock system is provided including a switch associated with each lamp and a series and time delay relays in such a manner that the lighted lamp of each cued key must be played by the player before this lamp will be extinguished and the next lamp will light. The drive of the music web will be stopped until the cued key is played. Thus, the player is disciplined to play the cued keys in the order indicated by the lighted cuing lamps and may not skip them. It is possible to deactivate temporarily this interlock system in the event that it is desired to advance the web to some other playing position.

It is therefore one object of the invention to provide music display and cuing apparatus including a device for displaying a music selection on a web of extended length moved past a viewing window.

A further object is to provide a music display device having means for moving a web of extended length past a viewing window for exposing a music selection inscribed on a first side of the web, and having a decoding head mounted in the device for sensing conductive stripes inscribed on the other side of the web, the stripes corresponding in length and position to the time value and pitch of notes appearing on the first side of the web.

Another object is to provide a visual cuing apparatus in association with the music display device described, the cuing apparatus having a series of lamps corresponding respectively to notes of a musical scale of one or more octaves. Each of the lamps being connected electrically to a different sensing element in the decoding head of the music display device, one or more lamps light up simultaneously as the music web passes a reading position in the music display device.

Still another object is to provide means for varying the speed of drive of the web in the music display device.

Another object is to provide means in the cuing display device for automatically transposing notes, appearing in one key on a music web in the music display device, into another selected key, and for indicating such transposition by lighting lamps corresponding to notes in the transposed key.

Another object is to provide a cuing display device as described embodied in a piano or similar musical instrument with an interlock system such that each cued key indicated by a lighted lamp must be played; otherwise, the drive of the music web stops and does not continue until the cued key or keys are played.

Other objects are to provide apparatus to facilitate learning: to sight read printed music, to transpose music from one key to another, to keep time in playing an instrument, to play chords, arpeggios, scales and entire music selections, to play music without having to look at a printed sheet while being cued as to notes to play; also to facilitate playing music from a moving music web so that turning of pages is avoided, etc.

For further comprehension of the invention, and of the objects and advantages thereof, reference will be had to the following description and accompanying drawings and to the appended claims in which the various novel features of the invention are more particularly set forth.

In the accompanying drawings forming a material part of this disclosure:

FIG. 1 is a front view of apparatus embodying the invention, including a music display device and cuing display device, shown mounted on a piano in position for use.

FIG. 2 is an enlarged horizontal sectional view through the music display device, taken on line 2—2 of FIG. 1.

FIG. 3 is a cross sectional view taken on line 3—3 of FIG. 2.

FIG. 4 is a fragmentary vertical sectional view taken on line 4—4 of FIG. 3.

FIG. 5 is an enlarged perspective view of part of the cuing display device.

FIG. 6 is an enlarged sectional view taken on line 6—6 of FIG. 5.

FIG. 7 is an enlarged, front view of the music decoding head, parts being broken away.

FIG. 8 is a greatly enlarged, fragmentary sectional view taken on line 8—8 of FIG. 7.

FIG. 9 is an enlarged fragmentary sectional view of the music decoding head shown in operating position with an associated music web.

FIG. 10 is a fragmentary perspective view of a music roll with part of one end of the web or sheet extended therefrom.

FIG. 11 is a simplified circuit diagram of the electrical system of the apparatus.

FIG. 12 is a detailed diagram of part of the electrical system of the apparatus.

FIG. 13 is a fragmentary plan view of another embodiment of the invention.

FIG. 14 is an enlarged sectional view taken on line 14—14 of FIG. 13.

FIG. 15 is a fragmentary elevational view of a control panel of the display device of FIG. 13.

FIG. 16 is a diagram of the electrical system of the apparatus of FIGS. 13–16.

Referring first to FIG. 1, there is shown apparatus 10 including the music display device 12 and the cuing display device 14 interconnected by a flexible cable 15 of any desired length. The device 12 is housed in a rectangular cabinet 16 which is shown disposed on top 17 of piano 18. The device 14 is housed in a long, narrow rectangular cabinet 20 standing on end legs 23. The cabinet 20 is positioned over and parallel to keyboard 24 of the piano. Legs 23 rest on the piano frame 25 at opposite ends of the keyboard.

The music display device 12 as best shown in FIGS. 1–4, to which reference is now made, is adapted to support a music scroll 30 for unwinding and displaying a web 32. The web is a wide sheet of paper, plastic or cloth of extended length wound up on reel 33 to form scroll 30. On the front side 31 of web 32 as best shown in FIG. 10, are imprinted horizontal music staves 34. As many as eight staves may be provided. Above the staves may be imprinted words 36 for which corresponding notes 38 appear on the staves. Notes 38 appear on a plurality of staves and may represent a part of voice to be sung and an accompaniment by the piano. Alternatively the notes on the several staves may represent parts to be played by different instruments. In any event the music selection appears at transparent viewing window 40 in the front of the cabinet.

At the rear side 42 of the music web are narrow horizontal electrically conductive stripes 44 corresponding respectively to the notes appearing at the other side 31. Each stripe has a predetermined length, ranging from the smallest corresponding to a $\frac{1}{128}$ note to a maximum length corresponding to one or more whole notes. The positions of the stripes transversely of the web between top and bottom edges correspond to the pitches of the respective notes inscribed on the staves. The stripes may be metallic, copper or aluminum or other conductive substance.

Window 40 is mounted in a rectangular opening 45 in the front wall 46 of the cabinet. The cabinet 16 has fixed end walls 48 and a bottom 49. A horizontal top panel 50 is integrally joined to a vertical back panel 52. Back panel 52 is joined at its lower edge by a hinge 54 to the rear edge of bottom 49. The cabinet can be opened at the top and back by tilting the cover defined by panels 50, 52, rearwardly away from the end and front walls as shown by dotted lines in FIG. 3. This provides to access to the interior of the cabinet for loading a scroll and for servicing the several components inside the cabinet.

The music decoding head 60 is a vertically disposed insulated bar in which are parts of vertically spaced springy wires 62; see FIGS. 2, 3, 7–9. The wires have flexible ends outside the bar with tips 63 turned forwardly to contact the electrically conductive stripes 44 on the back of web 32. Rear ends of wires 62 are connected in a circuit 100 shown in FIG. 11. A different pair of wires contact the back of web 32 on each different level. Two wires simultaneously wipe each stripe; see FIG. 9. Head 60 is supported by a bracket 61 on the cabinet bottom.

The web 32 is rolled up to form scroll 30 on supply reel 33 which is carried by axially vertical keyed shaft 66 of rewind motor 68 on the cabinet bottom 49. The web 32 is entrained around axially vertical right idler roller 70 located at the rear side of window 40. The web extends in a vertical plane along the window and passes rearwardly around axially vertical idler roller 72 located at the back of the window at the left end of the cabinet; see FIG. 2. Rollers 70 and 72 are both resilient members. They are supported on shafts 71, 73 carried by fixed bearings 74 on cabinet bottom 49. Rollers 70, 72 hold the paper smooth, flat and taut at the back of the window and in front of head 60.

Web 32 passes between an axially vertical capstan roller 75 and an axially vertical idler pressure roller 76. The capstan roller is mounted on shaft 77 of drive motor 78. This motor drives the capstan at constant speed so that the web is pulled across the window 40 at a speed determined by the setting of speed control 80 connected to the motor. The speed control is located at the front wall 46 of the cabinet and has its several settings marked from fast to slow by graduations on wall 46; see FIG. 1.

Another control 82 is also located at the front of the cabinet. This control turns rewind motor 68 on and off for rewinding the web from reel 84. Reel 84 is takeup reel carried on a keyed shaft 86 mounted in bearing 88 on the bottom of the cabinet; see FIGS. 2 and 4. On shaft 86 is a pulley 89 driven by an endless belt or cord 90 entrained on drive pulley 92 carried by drive shaft 77. The web winds up on reel 84 which is driven by motor 78 via drive belt 90. The belt 90 will slip on pulleys 89 and 92 while the capstan roller 75 turns at constant speed to keep the web winding up at constant speed on the reel 84 instead of winding up faster and faster as it would otherwise tend to do.

Batteries 95 which are replaceable and may be rechargeable are provided in the cabinet. The batteries are connected to the motors 68 and 78 for driving the same. The motors, batteries and controls are connected in an electric circuit 100 which is explained below in connection with FIG. 11.

The cuing device 14 shown in FIGS. 5 and 6 is provided with a series of lamp assemblies 102. One lamp assembly is disposed over each key of the piano. The lamp assemblies are identified by key markings 104 on panel 105 corresponding to the names of the piano keys directly underlying the lamp assemblies respectively. Each lamp assembly includes a transparent clear or colored lens 106 set in an aperture 108 in the front panel 105 of cabinet 20. The lens has an internal recess 112 in which is fitted a lamp 114 connected via wires 116 in circuit 100 referred to above. At the left end of panel 105 is a transposition control knob 120 which control at transposing network 125. This control and network can be set to transpose automatically by visual indications of the lamp assemblies from a particular key in which music appears on web 32 to any other selected key as is explained in further detail below. The cabinet 20 has a cover 126 pivoted on a hinge 128 to the back wall 129 of the cabinet for providing access to the interior of cabinet 20.

Referring now to circuit 100 shown in FIG. 11, the batteries 95 have one terminal 97 connected to one terminal of each of lamps 108. The other terminal 99 of the batteries is connected to terminal 130 of switch 132. This switch is physically embodied in the motor speed control 80. When the switch 132 is open the motor 78 is deenergized and all the lamps 108 are turned off. The other terminal of each of the lamps 108 is connected to the transposing network 125 shown in block form in FIG. 11. This network is explained below in greater detail in connection with FIG. 12. One wiper contact of each pair of contacts 62 is connected to the transposing network. The other wiper contact is connected to a common line 150 which terminates at ON-OFF switch 132. Motor 78 is connected between line 150 and speed control 80. Rewind motor 68 has one terminal connected to terminal 97 of the batteries. The other terminal of motor 68 is connected to motor control switch 82.

Motor control switch 82 is a double pole switch. One pole 151 is open when the other pole 152 is closed and vice versa. When switch 132 is open, both motors are off.

In operation of circuit 100, when a conductive stripe 44 which is a music code element bridges a pair of wiper contacts 62 which constitute a music note decoding element, the associated lamp 108 lights up provided that the transposition control 120 shown in FIGS. 1, 5 and 6 is set at "0" position. The transportation control 120 has thirteen positions designated respectively "0" to "11" and a final position designated "OCT" representing transposition of a full octave.

Referring now to FIG. 12, the transposition network 125 is partially shown in detail. Parts of circuit 100 associated directly with network 125 are also shown in FIG. 12. The network 125 includes a multiple deck switch 200. Each deck of the switch has thirteen contacts or terminals 202 and a rotatable switch contact arm 204 for each position of the switch control 120. Thirteen succssive lamps 108 are connected in succession to the contacts 202 of each switch deck. The thirteen lamps connected to each deck are also connected to the next succeeding deck and next preceding deck with two exceptions: (1) The first lamp of the thirteen lamps is not connected to the succeeding deck but the next lamp following the thirteen lamps is connected to the succeeding deck. (2) The thirteenth lamp is not connected to the preceding switch deck but the next lamp preceding the thirteen lamps is connected to the preceding switch deck.

The switch arms 204 are ganged together. By this arrangement when transposition switch control 120 is set to position "0" each lamp 108 connected to batteries 95 via switch 132 will light up when its corresponding note appears on the web 32 and is "read" by its corresponding pair of contact wipers 62. If that same note appears on web 32 and if control 120 is set to position "1" then the next lettered lamp 108 will light up on panel 105. If control 120 is set to position "2" and the same note mentioned above appears on web 32, the next succeeding lamp will light up. As examples, if a middle C note appears on web 32, the middle C lamp will light up on panel 105. If the transposition control 120 is set to position "1" the C# lamp will light up, if control 120 is set to position "2" the D lamp will light, if control 120 is set to position "3" the D# lamp will light, and so on for all the other switch positions. The "OCT" or octave position effects a transposition of a full octave. Thus with middle C note appearing on web 32, the lamp corresponding to the next higher note C′ will light up. By the arrangement described if a music selection is coded in any particular key on the back of web 32, the player can be cued by lamps 108 in this key or in any other selected key up to a full octave higher by appropriate setting of switch control 120. Only at position "0" of switch control 120 is no transposition effected and the lamps 108 light up to correspond directly with the notes appearing on the front of the web 32 and the coding on the back of the web.

At any time, the right-to-left drive of the web can be stopped and the web can be rewound by operating switch 82. Then at any point switch 82 can be operated to restore right-to-left drive at the tempo set by control 80. Thus a player can repeat the cuing of a particular passage of the music selection at will.

The device 12 can be used alone as a music display means for presenting a music selection to a player continuously so that the player does not have to turn pages as is necessary when sheet music is played. The player need not look at the music display at window 40 but can follow the lighting of lamps 108 in playing a music piece. The cuing device 14 can be made up in full length for eighty-eight notes which constitute a full piano keyboard, or can be made up in shorter length for just one or several octaves. In its shorter lengths the cuing device 14 will be appropriate for use with instruments having a range of a lesser number of octaves than the piano. The two devices 12 and 14 can be remotely located from each other and connected via cable 15. They need not stand in sight of each other. If desired, two or more cuing devices 14 can be connected in parallel to the one music decoding and display device 12 so that a plurality of players can be cued simultaneously.

Apparatus **10*a* shown in FIGS. 13–16 is similar to apparatus 10 and corresponding parts are identically numbered. In this apparatus the music display device 12*a* is identical to device 12 with the exception that an ADVANCE switch 250 is connected in circuit with motor 78. This switch has an operating push-button mounted at the front of the cabinet 16*a* just above the speed control 80**; see FIG. 15.

The cuing display device 14 is replaced and its essential components are installed in the piano **18*a*. Device 12*a* is set upon the top 17*a* of the piano. Cable 15*a*** connects the music display device to components of the cuing display device inside the piano.

The cuing display device includes a lamp **108*a* seated in a recess 254 in each piano key 24*a*, see FIG. 14. The recess is closed by a transparent clear or colored lens 255. The lenses for each octave of keys can be differently colored. Wires 258 extend through a bore 260 in each key and are connected in the circuit 100*a* shown in FIG. 16. Near the front of and under each key, just to the rear of front felt bumper 262 is affixed a microswitch 270. This switch has an operating button 272 extending upwardly for contact by the key when the key is depressed or played. The lamps and lenses are provided in both the black and white keys along with the circuit wires, microswitches. The microswitches are connected in the circuit 100***a*. The transposition control 120 is mounted at one end of the keyboard on end panel 275 of the piano case. It is connected in transposing network 125 provided in circuit 100*a* shown in FIG. 16 to which reference is now made. This circuit is arranged like circuit 100 of FIG. 11 and corresponding parts are identically numbered. Additional parts have been provided in circuit 100*a* to constitute an interlock system which will now be explained.

It will be noted that circuit 100*a* includes a plurality of time delay relays 280 each having a coil 282, a movable contact 284 and two fixed contacts 285 and 286. In normal deactivated condition of the relay, contact 284 is closed with contact 285. The contact 284 of each relay is connected to the fixed contact 285 of each adjacent relay in a series circuit arrangement. The last movable relay contact 284' is connected to one terminal 78' of motor 78. The fixed contact 285' of the first relay is connected to fixed contact 290 of switch 82 shown closed with switch pole 152 in FIG. 16. The other switch pole 151 is open with respect to switch contact 292.

Each microswitch 270 has two contacts 295, 298 normally closed by shunting bar 296. When the button 272 is pressed by actuation or playing of a piano key the switch opens as bar 296 is moved away from the contacts 295 and 298. One end of each relay coil 282 is connected to a contact 295. Each contact 298 is connected to one terminal of associated lamp 108*a* and to battery terminal 97. The other terminal of each lamp is connected to transposing network 125. The other end of each relay coil is connected to line 150*a* which is connected to line 150. Line 150 terminates at battery terminal 99.

The ADVANCE pushbutton switch 250 is connected between terminal 78' of motor 78 and contact 290 of switch 82. Switch 250 is normally open as shown in FIG. 16.

The relays 280 are timed so that when their coils are energized, relay contacts 284, 285 will open in not less than two-tenths of a second and not more than four-tenths of a second, and in no event in less time than the time allotted for playing any note on the music web. The relays 280 are timed to close contacts 284, 285 after the relays become deenergized, in not more than one-tenth of a second.

In operation of the apparatus 10*a* including circuit 100*a*, the music web will be driven across the display device 12*a* to display printed music notes. The spaced pairs of wires 62 will contact conductive stripes 44 at the back of the music web for each note indicated on the front of the music web. When any stripe is located, a lamp 108*a* will light up depending on the setting of the transposing network 125. Motor 78 will drive the music web at a speed determined by the setting of motor speed control 80 when switch 132 is closed with contact 130. To this extent the operation is the same as for apparatus 10 described above.

If the player does not play the key indicated by a lighted lamp then the associated relay will open its contacts 284, 285 and the power supply circuit of motor 78 will open and the motor will stop. The time delay relay permits about two-tenths to four-tenths of a second for the player to react to the lighting of a lamp. If the player does not react in this time, the motor drive stops. Then if the player does play the indicated key, the motor will be reactivated as the relay responds within one-tenth of a second to close its open contacts 284, 285 and close the power supply circuit of the motor.

When chords are displayed on the music sheet, two or more lamps 108*a* will light up simultaneously and the player must play all the indicated or cued keys. If he omits to play any one or more notes of the chord, the motor will stop at the relay or relays associated with the unplayed key or keys and open at their contacts 284, 285. The player is thus required and disciplined to play all the indicated or cued keys and to play them quickly. A reasonable time is allowed for response before the motor drive stops. The player must hold long notes for the full indicated duration. If the player prematurely releases the key, i.e., at least two-tenths of a second before the key should be released, the motor drive will stop and the player must complete playing the key to reactivate the motor drive.

Sometimes the player in practicing a piece of music may desire to advance the music web a certain distance without having to play each note as the lamps light up. This can be done by pressing the ADVANCE switch 250 to by-pass the contacts 284, 285 of the relays so that the motor 78 will run as long as the switch 250 is held closed. Once the switch 250 is released, the automatic interlock stop-and-start system will be reactivated. Rewind motor 68 is independent of the interlock system and operates when switch 82 is set to REWIND position.

The apparatus will be found to be a valuable adjunct in facilitating the teaching of music theory, in instrument practice, in learning sight reading of music, in transposing music and learing transposition, in gaining familiarity with music pieces, in progressively gaining speed and accuracy in playing, and many other ways. Various other uses of the apparatus will readily become apparent to students, teachers, instrumentalists, singers, orchestra conductors and others concerned with learning, teaching and playing of music.

While I have illustrated and described the preferred embodiments of my invention, it is to be understood that I do not limit myself to the precise constructions herein disclosed and that various changes and modifications may be made within the scope of the invention as defined in the appended claims.

I claim:

1. Apparatus for displaying cuing music, comprising a support, a display window mounted in a fixed vertical position on said support, means for movably supporting and carrying a web composed entirely of nonconductive sheet material in a vertical position horizontally along said window for displaying music notes inscribed on one side of said web through said window, motor drive means for driving said web, a decoding head supported adjacent to said window for sensing electrically conductive-code elements on the other side of said web, said elements corresponding to the notes on the one side of the web passing said decoding head, a musical instrument having a plurality of keys, a plurality of lamps carried by the keys respectively, said decoding head having a plurality of pairs of decoding elements disposed in uniformly spaced array, circuit means interconnecting said pairs of decoding elements with said lamps respectively so that a certain lamp lights only when an associated pair of decoding elements senses the presence of one of said music code elements on the other side of the web, each of said decoding elements comprising a pair of wires supported in an insulated block and extending outwardly of said block to contact only one code element at a time on the other side of said web.

2. Apparatus for displaying cuing music, comprising a support, a display window mounted in a fixed vertical position on said support, means for movably supporting and carrying a web composed entirely of nonconductive sheet material in a vertical position horizontally along said window for displaying music notes inscribed on one side of said web through said window, motor drive means for driving said web, a decoding head supported adjacent to said window for sensing electrically conductive code elements on the other side of said web, said elements corresponding to the notes on the one side of the web passing said decoding head, a musical instrument having a plurality of keys, a plurality of lamps carried by the keys respectively, said decoding head having a plurality of pairs of decoding elements disposed in uniformly spaced array, circuit means interconnecting said pairs of decoding elements with said lamps respectively so that a certain lamp lights only when an associated pair of decoding elements senses the presence of one of said music code elements on the other side of the web, each of said decoding elements comprising a pair of wires supported in an insulated block and extending outwardly of said block to contact the other side of said web, and an interlock system including a plurality of time delay relays and switches in circuit with said lamps respectively and with said motor drive means, so that said motor drive means stops driving said web, a predetermined time after any one lamp lights up unless the key carrying the lighted lamp is played before expiration of said predetermined time, and whereby said motor drive means resumes driving said web when the key carrying a lighted lamp is played after the drive of the webs stops, said interlock system further including switch means in circuit with said motor and operable independently of said keys for bypassing said relays to keep said motor drive means operative to advance the web independently of the lighting of the lamps and of the playing of the keys.

3. Apparatus for displaying and cuing music comprising a support, a display window mounted in a fixed vertical position on said support, means for movably supporting and carrying a web composed entirely of nonconductive sheet material in a vertical position horizontally along said window for displaying music notes inscribed on one side of said web through said window, and a decoding head supported adjacent to said window for sensing electrically conductible code elements on the other side of said web, said elements corresponding to the notes on the one side of the web passing said decoding head, another support, a plurality of lamps disposed in predetermined spaced positions along said other support, said decoding head having a plurality of pairs of decoding elements disposed in uniformly spaced vertical array, and circuit means interconnecting said pairs of decoding elements with said lamps respectively so that a certain lamp lights up when an associated pair of decoding elements senses the presence of one of said music code elements on the other side of the web, a transposition network connected in circuit with said lamps, said network including a multiple setting switch having a multiplicity of decks with a plurality of contacts in each deck, groups of said lamps being connected to contacts in several decks so that when any pair of decoding elements senses any one music code element a selected lamp will light other than said certain lamp, depending on the setting of said switch, said other support comprising a musical instrument having a plurality of playing keys, said lamps being carried by the keys respectively, motor drive means for driving said web, and an interlock system including a plurality of time delay relays and switches in circuit with said lamps respectively and with said motor drive means, so that said motor drive means stops driving said web a predetermined time after any one lamp lights up unless the key carrying the lighted lamp is played before expiration of said predetermined time, and whereby said motor drive means resumes driving said web when the key carrying a lighted lamp is played after the drive of the web stops.

4. Apparatus for displaying and cuing music comprising a support, on a display window mounted in a fixed vertical position on said support, an axially vertical shaft for rotatably supporting music scroll, a cooperating capstan and roller for drawing a web composed entirely of nonconductive sheet material from said scroll in a vertical position horizontally along said window, to display music notes inscribed on one side of the web, first motor means operatively connected to and driving said capstant at a constant speed in one direction, and other motor means operatively connected to said shaft for driving said scroll in an opposite direction for rewinding said web thereon, and a decoding head supported adjacent to said window for sensing electrically conductive code elements on the other side of said web, said elements corresponding on length and position to the time values and pitches respectively of the notes on the one side of the web passing and decoding head, another support, a plurality of lamps disposed in predetermined spaced positions along said other support, said decoding head having a plurality of pairs of decoding elements disposed in uniformly spaced vertical array, and circuit means interconnecting said pairs of decoding elements with said lamps respectively so that a certain lamp lights when an associated pair of decoding elements senses the presence of one of said music code elements on the other side of the web, a transposition network connected in circuit with said lamps, said network including a multiple setting switch having a multiplicity of decks with a plurality of contacts in each deck, groups of said lamps being connected to contacts in several decks so that when any decoding element senses any one music code element a selected lamp will light other than said certain lamp, depending on the setting of said switch, said other support comprising a musical instrument having a plurality of playing keys, said lamps being carried by the keys respectively, and an interlock system including a plurality of time delay relays and switches in circuit with said lamps respectively and with said first motor means, so that said first motor means stops driving said web a predetermined time after any one lamp lights up unless the key carrying the lighted lamp is played before expiration of said predetermined time, and whereby said first motor drive means resumes driving said web when the key carrying a lighted lamp is played after the drive of the web stops.

5. Apparatus for displaying and cuing music comprising a support, a display window mounted in a fixed vertical position on said support, an axially vertical shaft for rotatably supporting music scroll, a cooperating capstan and roller for drawing a web composed entirely of nonconductive sheet material from said scroll in a vertical position horizontally along said window, to display music notes inscribed on one side of the web, first motor means operatively connected to and driving said capstan at a constant speed in one direction, and other motor means operatively connected to said shaft for driving said scroll in an opposite direction for rewinding said web thereon, and a decoding head supported adjacent to said window for sensing electrically conductive code elements on the other side of said web, said elements corresponding in length and position to the time values and pitches respectively of the notes on the one side of the web passing and decoding head, another support, a plurality of lamps disposed in predetermined spaced positions along said other support, said decoding head having a plurality of pairs of decoding elements disposed in uniformly spaced vertical array, and circuit means interconnecting said pairs of decoding elements with said lamps respectively so that a certain lamp lights when an associated pair of decoding elements senses the presence of one of said music code elements on the other side of the web, and control means connected in circuit with said first motor means for setting the speed of drive of said web by said capstan at any one of a plurality of predetermined speeds, a transposition network connected in circuit with said lamps, said network including a multiple setting switch having a multiplicity of decks with a plurality of contacts in each deck, groups of said lamps being connected to contacts in several decks so that when any decoding element senses any one music code element a selected lamp will light other than said certain lamp, depending on the setting of said switch, said other support comprising a musical instrument having a plurality of playing keys, said lamps being carried by the keys respectively, and an interlock system including a plurality of time delay relays and switches in circuit with said lamps respectively and with said first motor means, so that said first motor means stops driving said web a predetermined time after any one lamp lights up unless the key carrying the lighted lamp is played before expiration of said predetermined time, and whereby said first motor drive means resumes driving said web when the key carrying a lighted lamp is played after the drive of the web stops, said interlock system further including switch means in circuit with the first motor and operable independently of said keys for bypassing said relays to keep said first motor means operative to advance said web independently of the lighting of the lamps and of the playing of the keys.

References Cited

UNITED STATES PATENTS 1,708,643 4/1929 Votey ---------------- 84—478
1,965,906 7/1934 Pettingell ----------- 84—470
2,223,009 11/1940 Rupp et al. ---------- 84—478
2,483,570 10/1949 Bergey --------------- 84—484
3,030,848 4/1962 Wick ----------------- 84—445
3,153,365 10/1964 Redmond -------------- 84—478

FOREIGN PATENTS 1,253,603 1/1961 France.

RICHARD B. WILKINSON, *Primary Examiner.*

STEPHEN J. TOMSKY, *Examiner.*

L. R. FRANKLIN, *Assistant Examiner.*